United States Patent
Morizumi (10) Patent No.: US 10,491,393 B2
(45) Date of Patent: Nov. 26, 2019

(54) ELECTRONIC DEVICE AND DECODING PROGRAM

(71) Applicant: Smart Mobile Broadcasting Technology, Inc., Taipei (TW)

(72) Inventor: Toshimi Morizumi, Taipei (TW)

(73) Assignee: SMART MOBILE BROADCASTING TECHNOLOGY, INC., Taipei (TW)

(*) Notice: Subject to any disclaimer, the term of this patent is extended or adjusted under 35 U.S.C. 154(b) by 167 days.

(21) Appl. No.: 15/680,538

(22) Filed: Aug. 18, 2017

(65) Prior Publication Data

US 2018/0062845 A1    Mar. 1, 2018

(30) Foreign Application Priority Data

Aug. 26, 2016  (TW) .............................. 105127407 A (51) Int. Cl.
| | | |
|---|---|---|
| H04L 29/04 | (2006.01) | |
| H04L 9/32 | (2006.01) | |
| H04L 9/08 | (2006.01) | |
| H04L 9/14 | (2006.01) | |
| H04N 21/2347 | (2011.01) | |

(Continued)

(52) U.S. Cl.
CPC .......... H04L 9/3226 (2013.01); H04L 9/0819 (2013.01); H04L 9/0894 (2013.01); H04L 9/12 (2013.01); H04L 9/14 (2013.01); H04N 21/2347 (2013.01); H04N 21/4405 (2013.01); H04N 21/4623 (2013.01); H04N 21/47211 (2013.01);

(Continued)

(58) Field of Classification Search
CPC ....... H04L 9/3226; H04L 9/12; H04L 9/0894; H04L 9/0819; H04L 9/14; H04L 2209/603; H04L 2209/601; H04N 21/4623; H04N 21/4405; H04N 21/47211; H04N 21/2347

See application file for complete search history.

(56) References Cited

U.S. PATENT DOCUMENTS

| | | | | |
|---|---|---|---|---|
| 6,515,619 B1* | 2/2003 | McKay, Jr. | ............. | G01S 1/047 342/357.74 |
| 2003/0004881 A1* | 1/2003 | Shinzaki | ................. | H04L 63/04 705/51 |

(Continued)

FOREIGN PATENT DOCUMENTS

| | | |
|---|---|---|
| JP | 11308595 A | 11/1999 |
| JP | 2011109311 A | 6/2011 |

OTHER PUBLICATIONS

Smith et al., "Real-time myoelectric decoding of individual finger movements for a virtual target task", 2009 Annual International Conference of the IEEE Engineering in Medicine and Biology Society, Date of Conference: Sep. 3-6 (Year: 2009).*

*Primary Examiner* — Morshed Mehedi
(74) *Attorney, Agent, or Firm* — Locke Lord LLP; Tim Tingkang Xia, Esq.

(57) ABSTRACT

The present invention provides an electronic device that decodes, through simple procedures, content encoded within a preset time period. The electronic device comprises: a tuner 1, a CAS (Conditional Access System) client 2, and a renderer 3. The CAS client 2 comprises: a control unit 21, a timing unit 22, and a decryption key generating unit 23. The timing unit 22 and the decryption key generating unit 23 are disposed in the CAS client 2; as a result, a preview operation can be easily performed without sending elapsed time information from the renderer 3 to the CAS client 2.

5 Claims, 5 Drawing Sheets

(51) Int. Cl.
    *H04N 21/4405*    (2011.01)
    *H04N 21/4623*    (2011.01)
    *H04N 21/472*     (2011.01)
    *H04L 9/12*       (2006.01)

(52) U.S. Cl.
    CPC .. *H04L 2209/601* (2013.01); *H04L 2209/603* (2013.01)

(56) References Cited

U.S. PATENT DOCUMENTS

| | | | | |
|---|---|---|---|---|
| 2003/0014712 | A1* | 1/2003 | Yano | H03M 13/2975 |
| | | | | 714/786 |
| 2004/0107092 | A1* | 6/2004 | Harada | G10L 19/22 |
| | | | | 704/215 |
| 2004/0179691 | A1* | 9/2004 | Hori | G06F 21/10 |
| | | | | 380/277 |
| 2006/0069650 | A1* | 3/2006 | Hori | G06Q 10/10 |
| | | | | 705/57 |
| 2009/0132893 | A1* | 5/2009 | Miyazaki | H03M 13/2975 |
| | | | | 714/776 |
| 2012/0250861 | A1* | 10/2012 | Ishii | H04N 21/4181 |
| | | | | 380/210 |
| 2014/0150011 | A1* | 5/2014 | Ohno | H04N 21/4524 |
| | | | | 725/31 |

* cited by examiner

ELECTRONIC DEVICE AND DECODING PROGRAM

RELATED APPLICATIONS

This application claims priority to Taiwan Application Serial Number 105127407, filed on Aug. 26, 2016, which is incorporated by reference herein in its entirety.

BACKGROUND OF THE INVENTION

Field of the Invention

The present invention relates to an electronic device and a decoding program for decoding an encoded content signal.

Description of the Prior Art

It has become common nowadays to distribute content signals from broadcasting stations and reproduce them through electronic devices such as smartphones, personal computers, televisions, and the like. In the case of paid broadcasting services, a content distributor encrypts and distributes their content signals in order to protect their own profit throughout the distribution process. In view of the above, only users who have specifically signed a contract with the content distributor can decode the content signals and view the content.

However, in the case of distribution of encoded content signals, viewers who did not sign any contracts may still be allowed to view the contents for a short time, in order to increase the number of subscribers. Such short-term playback of content is also called preview.

PRIOR ART REFERENCE

[Patent Document 1] Japanese Unexamined Patent Publication No. 2011-216941.

SUMMARY OF THE INVENTION

Problems to be Solved by the Invention

During a preview process, it is required to decode the encoded content within a preset preview time period. It is therefore essential to manage the decoding time properly, but the loading for the electronic device would increase if operations of such process are complicated.

In view of the above problems, an object of the present invention to provide an electronic device and a decoding program that decode, through simple procedures, content signals encoded within a preset time period.

Means for Solving the Problems

In one aspect, provided herein is an electronic device that decodes encoded content signals using decryption keys, comprising: a decryption key transmitting unit that transmits the decryption keys; and a decryption key receiving unit that receives the content signals and the decryption keys, and decodes the content signal using the decryption keys. The decryption key transmitting unit thereof begins timing simultaneously at a time when transmission of the decryption keys starts, and when elapsed time reaches an end of the preset time period for the content signals, the transmission of the decryption keys is stopped.

In such configuration, the decryption key transmitting unit can obtain transmission time information through a timing function performed therein. Operations within the electronic device can therefore be simplified.

Furthermore, when the transmission of the decryption keys is completed before the elapsed time reaches an end of the preset time period, the decryption key transmitting unit may also, based on the measured elapsed time, store transmission time information indicating a time period for completion of the transmission of the decryption keys. When the content signals are being received again by the decryption key receiving unit, the transmitting unit transmits the decryption keys, based on the transmission time information, before the total transmission time for the decryption keys reaches an end of the preset time period. When the total transmission time for the decryption keys reaches an end of the preset time period, the transmission of the decryption keys is stopped by the transmitting unit.

In such configuration, based on storage of the transmission time information indicating a time period for completion of the transmission of the decryption keys, the content signals may be decoded at a plurality of times during the preset time period thereof.

In an embodiment, the decryption key transmitting unit may also include: a timing unit that starts timing substantially at the same time when the transmission of the decryption keys begins; and a decryption key generating unit that generates the decryption keys and transmits the keys to the receiving unit, while stopping transmitting the decryption keys when the elapsed time measured by the timing unit reaches an end of the preset time period.

In another aspect of the present invention, provided herein is an electronic device that decodes encoded content signals using decryption keys, comprising: a decryption key transmitting unit that transmits the decryption keys, and displays the preset time information relating to the content signals; and a decryption key receiving unit that receives the encoded content signals, the decryption keys, and the time information, while decoding the content signals using the decryption keys. In the electronic device, the decryption key receiving unit starts timing simultaneously when reception of the decryption keys starts, and stops decoding the content signals when the elapsed time reaches an end of the preset time period.

In such configuration, the decryption key receiving unit starts timing upon receiving preset time information, thereby simplifying operations within the electronic device.

Furthermore, when the decoding of the content signals is completed before the elapsed time reaches the end of the preset time period, the decryption key receiving unit transmits completion time information relating to the decoding of the content signals to the decryption key transmitting unit. When the content signals are being received again by the decryption key receiving unit, the decryption key transmitting unit transmits the completion time information to the decryption key receiving unit. Upon receiving the content signals again, the decryption key receiving unit decodes the content signals before a total decoding time for the content signals reaches the end of the preset time period based on the completion time information. When the total decoding time for the content signals reaches the end of the preset time period, the decoding of the content signals is stopped.

In such configuration, based on storage of the completion time information relating to the decoding of the content signals, the signals may be decoded at a plurality of times during the preset time period for them.

In an embodiment, the decryption key receiving unit may include: a timing unit that starts timing substantially at the same time when reception of the decryption keys starts; and a decoding unit that decodes the content signals using the decryption keys, and stops decoding the content signals when the elapsed time measured by the timing unit reaches an end of the preset time period.

The electronic device may also include a tuner that extracts the encoded content signals from input signals and transmits the content signals to the decryption key receiving unit. The tuner also extracts control information indicating the preset time from the input signals, and transmits the information to the decryption key transmitting unit.

Furthermore, in yet another aspect of the present invention, provided herein is an electronic device comprising a decryption key transmitting unit capable of transmitting decryption keys that are used for decoding encoded content signals to a decoding unit. The transmitting unit also starts timing simultaneously at a time when transmission of the decryption keys starts, and stops the transmission when measured elapsed time reaches an end of the preset time period for the content signals.

Furthermore, in still another aspect of the present invention, provided herein is an electronic device comprising a decryption key receiving unit that receives the encoded content signals, a decryption key for decoding the encoded content signals, and time information indicating a preset time period for the content signals, and decodes the content signals using the decryption keys. The decryption key receiving unit also starts timing simultaneously at a time when reception of the decryption keys starts, and stops decoding the content signals when measured elapsed time reaches an end of the preset time period.

Furthermore, in a still further aspect of the present invention, provided herein is a decoding program enabling a computer to operate as any of the above electronic devices so as to perform corresponding functions of each unit included in the electronic device.

Effects of the Invention

The present invention enables simple procedures for decoding encoded content within a preset time period.

DETAILED DESCRIPTION OF THE PREFERRED EMBODIMENTS

Embodiments of the present invention will be specifically described hereinafter with reference to the drawings.

First Embodiment

Figure 1:
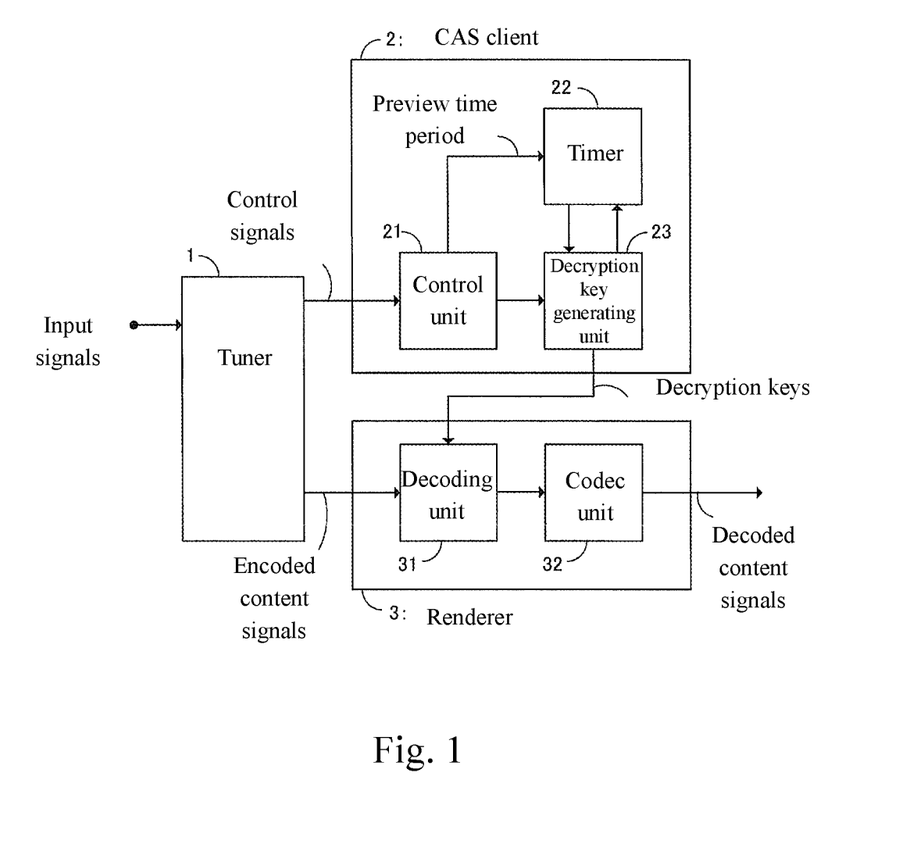
FIG. 1 is a block diagram showing a schematic configuration of an electronic device according to a first embodiment of the present invention.

FIG. 1 is a block diagram showing a schematic configuration of an electronic device according to the first embodiment of the present invention. The electronic device shown in FIG. 1 can be, for example, a smartphone, a tablet terminal, or a personal computer.

The electronic device includes a tuner 1, a CAS (Conditional Access System) client 2, and a renderer 3. Either the CAS client 2 or the renderer 3, or both of them, may be hardware implemented, or at least a part of them may be software implemented. In the case of software implementation, the electronic device is able to perform (at least one part of) the functions of the CAS client 2 and the renderer 3 when a processor thereof (not shown in the drawings) executes a decoding program (not shown in the drawings) recorded in a non-volatile memory.

Input signals, such as radio wave signals transmitted from a broadcasting station, or signals transmitted by a means of communication, are sent into the electronic device. The input signals here include one or a plurality of encoded content signals, each of which comes with control signals.

The tuner 1 receives input signals, switches between channels in accordance with the setting of the user, and extracts encoded content signals and a set of control signals from the input signals. The encoded content signals are transmitted to the renderer 3, while the control signals are sent to the CAS client 2.

The content signals include video signals and audio signals. Since the content signals are encoded, decryption keys (described hereafter) are required to decode and reproduce the content signals. Also, the content signals may only include either the video signals or the audio signals.

The control signals include information useful in determining whether to decode the encoded content signals, that is, information useful in determining whether decryption keys are able to be generated. When the content signals are able to be previewed, despite the fact that a content reproduction agreement is yet to be signed between a company and the user, the content may be reproduced within a certain period of time. In such case, the control signals further include: information indicating a preview of the content essentials is possible and information indicating the time period during which the content signals can be reproduced as a preview (also simply referred to as a preview time period or preset time period). The preview time period can be, for example, preset by the content distributor for the content signals.

The CAS client 2 includes a control unit 21, a timer (timing unit) 22, and a decryption key generating unit 23.

Using the control information extracted from the input signals, the control unit 21 determines whether or not to generate decryption keys based on the status of the contract signed by the user, or on conditions for content usage. The contract status and the conditions for content usage are stored in advance in the CAS client 2.

When a contract for reproducing the content signal sent from the tuner 1 is signed, the control unit 21 instructs the decryption key generating unit 23 to generate decryption keys and transmit the keys to the renderer 3. As a result, the content signals are decoded, allowing the content to be viewed by the user.

When a contract for reproducing the content signal sent from the tuner 1 is yet to be signed, the controller 21 does not, in principle, instruct the generating unit to generate decryption keys. As a result, the content signals are not decoded and the content cannot be viewed by the user.

On the other hand, even if the contract for reproducing the content signal sent from the tuner 1 is yet to be signed, the control signals still include information indicating a preview of the content essentials is possible. In such case, the control unit 21 instructs the decryption key generating unit 23 to generate decryption keys and transmits the key to the renderer 3. Furthermore, the control unit 21 sets the preview time period in the timer 22, and instructs the timer 22 to start timing.

The timer 22 starts timing in accordance with the instructions from the control unit 21. In this embodiment, the timing function performed by the timer 22 shows an example of using a preview time amount as an initial value to count down until the reading reaches zero.

In accordance with the instructions from the control unit 21, the decryption key generating unit 23 starts generating decryption keys and transmitting (send out) the keys to the renderer 3. Next, the decryption key generating unit 23 stops generating the decryption keys based on the elapsed time measured by the timer 22. More specifically, the decryption key generation unit 23 checks the elapsed time measured by the timer 22. If the elapsed time has not reached the end of the preview time period, that is to say, if the reading of the timer 22 has not reached zero, the decryption key generation unit 23 continues to transmit the keys periodically (one key per second, for example). On the other hand, when the elapsed time reaches the end of the preview time period, that is to say, when the reading of the timer 22 reaches zero, the decryption key generating unit 23 stops generating the decryption keys.

As described above, the CAS client 2 operates as a decryption key transmitting unit that transmits the decryption keys to the renderer 3 within a preset preview time period.

On the other hand, the renderer 3 is a decryption key receiving unit, including a decoding unit 31 and a codec unit 32. The decoding unit 31 receives the decryption keys from the CAS client 2 and decodes the encoded content signals using the decryption keys. The term "decoding" means to decrypt a code. Furthermore, the codec unit 32 converts the decoded content signals into video signals and audio signals. The video signals and the audio signals may be transmitted to a resident (not shown in the drawings). In this manner, the renderer 3 can decode the content signals while receiving the decryption keys; however, the renderer cannot decode the content signals without the decryption keys transmitted from the CAS client 2.

Figure 2:
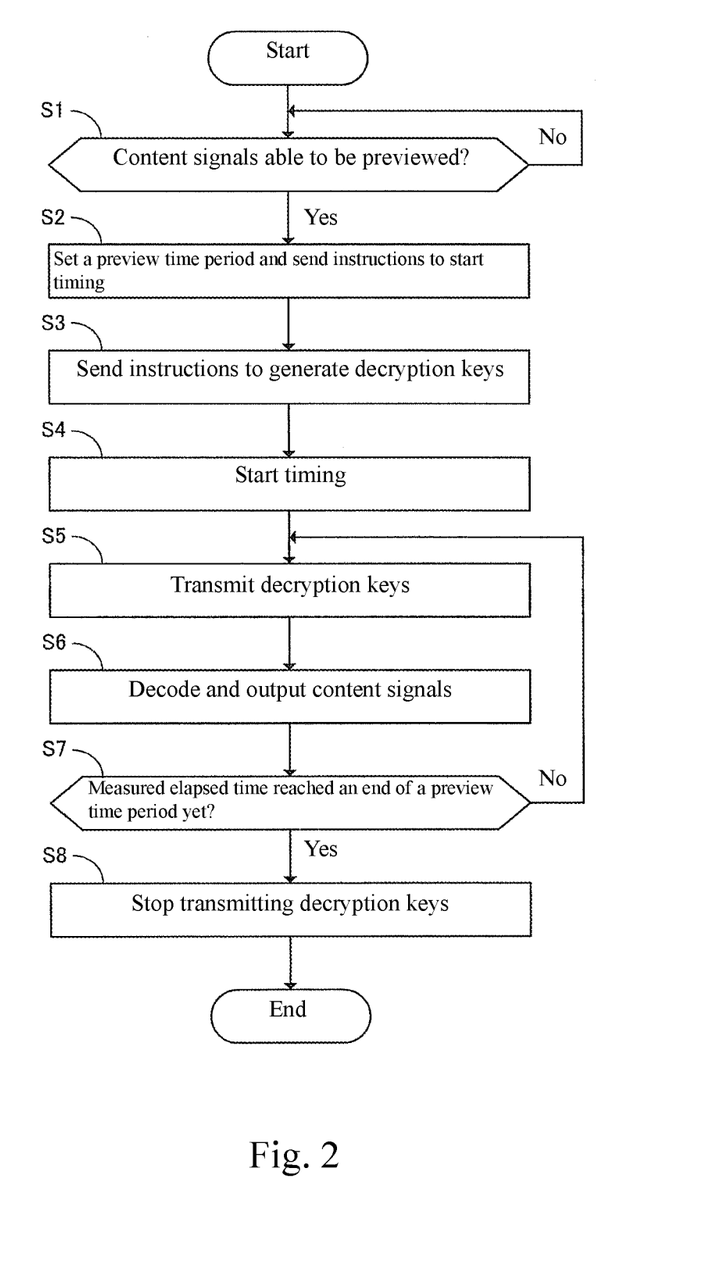
FIG. 2 is a flowchart showing an example of operations for running a preview in the electronic device shown in FIG. 1.

FIG. 2 is a flowchart showing an example of operations for running a preview in the electronic device shown in FIG. 1. Steps S1 through S8 are presented in FIG. 2 in sequential order for convenience sake, while the operations are not required to be executed in such order. Some operations may be properly replaced or executed simultaneously.

Control information on the content signals transmitted from the tuner 1 to the renderer 3 is sent into the control unit 21. When the control unit 21 determines that previewing the content signals is possible ("YES" in step S1) based on the control information, it sets a preview time period in the timer 22 according to the preview time period included in the control information, and instructs the timer 22 to start timing (step S2). Furthermore, the control unit 21 instructs the decryption key generating unit 23 to generate decryption keys and start transmitting the keys to the renderer 3 (step S3).

In response to the instructions from the control unit 21, the timer 22 starts timing and counting down using the set preview time amount as an initial value (step S4). On the other hand, the decryption key generating unit 23 generates decryption keys and starts transmitting the keys to the renderer 3 (step S5). As a result, the timer 22 starts timing substantially at the same time when transmission of the decryption keys starts.

Upon receiving the decryption keys, the decoding unit 31 of the renderer 3 decodes the encoded content signals using the decryption keys. Furthermore, the codec unit 32 converts the decoded content signals into video signals and audio signals. Next, the renderer 3 outputs the video signals and the audio signals (step S6), allowing the content to be viewed by the user.

On the other hand, the decryption key generating unit 23 checks the elapsed time measured by the timer 22 while transmitting the decryption keys (step S7). When the elapsed time has not reached the end of the preview time period, that is to say, when the reading of the timer 22 has not reached zero ("NO" in step S7), the decryption key generating unit 23 continues to transmit the decryption keys to the renderer 3 (step S5). Next, whenever the same content signals are transmitted from the tuner 1, steps S5 to S7 are repeated before the elapsed time reaches the end of the preview time period.

When the elapsed time reaches the end of the preview time period, that is to say, when the reading of the timer 22 reaches zero ("YES" in step S7), the decryption key generating unit 23 stops transmitting the decryption keys to the renderer 3 (step S8). In this manner, when the transmission time for the decryption keys is deemed to have reached the end of the preview time period based on the elapsed time, the decryption key transmission from the decryption key generating unit 23 to the renderer 3 is stopped. As a result, the renderer 3 cannot decode the encoded content signals, thereby ending the preview. When the preview time period has elapsed and the preview is ended, the control unit 21 may store in advance information relating to specific content of which the preview has ended. In such case, no more previews will be allowed for content signals received later on.

As described above, the electronic device can decode the encoded content signals. It can be understood from the above description that the time period during which decoding is allowed is the time period during which the decryption key generating unit 23 transmits the decryption keys to the renderer 3. Such time period, in other words, is equivalent to the preview time period.

Furthermore, if the timer 22 starts timing at the same time when the transmission of the decryption keys starts, step S7 can be carried out by simply taking into account the lag and stopping the transmission of the keys as soon as the elapsed time reaches the end of the preview time period. On the other hand, when a time lag occurs between the start of key transmission and the start of timing by the timer 22, step S7 can be carried out by simply taking into account the lag and stopping the transmission of the keys as soon as the transmission time for the decryption keys reaches the end of the preview time period.

Also, it should be noted that when the timer 22 is not disposed in the CAS client 2 but in the renderer 3, the preview time information is obtained by the CAS client 2, while the decoding time measured by the renderer 3. As a result, in order for the decryption key generating unit 23 in the CAS client 2 to transmit the decryption keys during the preview time period, the elapsed time measured by the renderer 3 must be sent to the CAS client 2 as a feedback. With such feedback process, the configuration and operations of the renderer 3 are inevitably complicated.

In addition, in the present embodiment, the timer 22 and the decryption key generating unit 23 are disposed in the CAS client 2. Therefore, the renderer 3 is not required to send the elapsed time information to the CAS client 2 as a feedback, thereby simplifying the configuration and operations thereof to perform a preview. Also, since the renderer 3 does not require a timer therein, installation of the renderer 3 is simplified.

Second Embodiment

The second embodiment to be described below is a variation of the first embodiment, and relates to an operation of performing a preview within a time period shorter than a preset preview time period. For example, a content signal may be required to be decoded within 7 seconds while a permitted preview time is 10 seconds. Differences between the second embodiment and the first embodiment will be illustrated below.

In the second embodiment, the configuration of the electronic device itself is almost identical to FIG. 1. However, as the control unit 21 ends the preview during the preview time period by switching between content signals selected by the user, it stores the remaining preview time period. In the above numerical example, when the preview is performed for the first time, the timer 22 counts down using "10 seconds" as an initial value. Next, when the preview is completed "7 seconds" from the start of the countdown, or a reading of the timer 22 is "3 seconds", the information "3 seconds" is stored in the control unit 21 as the remaining preview time period for the content signals. Later, when the same content is previewed again, the timer 22 counts down using "3 seconds" as an initial value.

Figure 3:
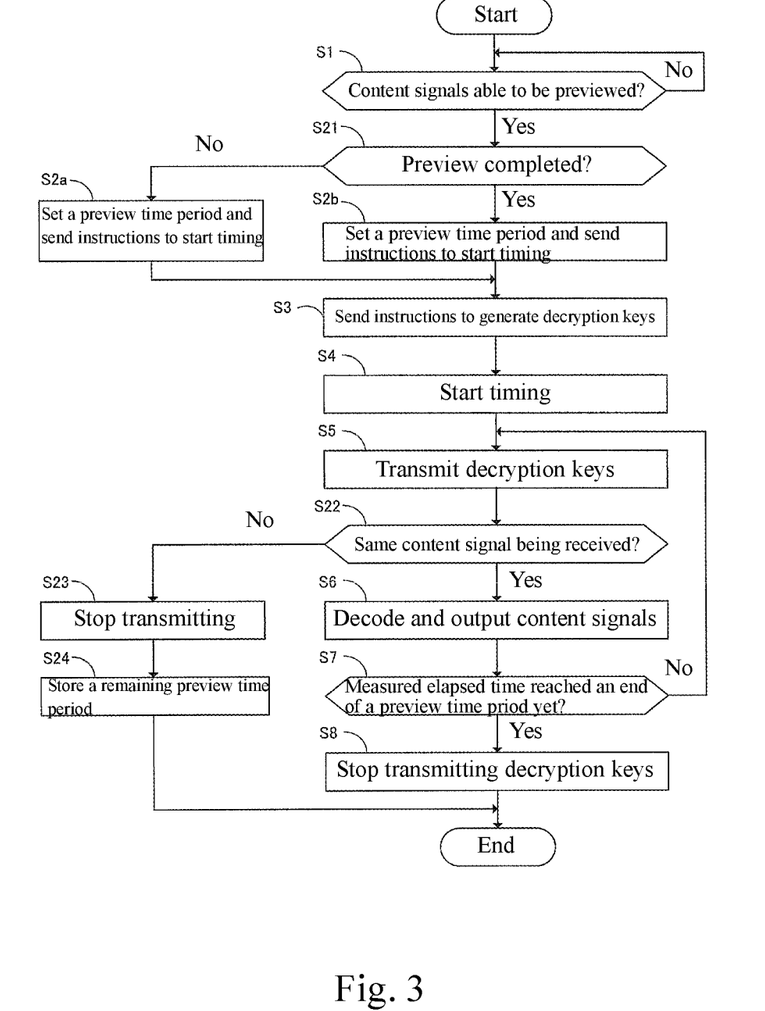
FIG. 3 is a flowchart showing an example of operations within the electronic device according to a second embodiment.

FIG. 3 is a flowchart showing an example of operations within the electronic device according to the second embodiment. The operations therein shared by FIG. 2 are denoted by the same reference numerals. To facilitate understanding, the following description of this embodiment begins by explaining step S22 shown in FIG. 3, along with simplified explanations on the operations shared by the first embodiment.

While the renderer 3 decodes the content signals using the decryption keys, the tuner 1 does not switch between content signals. As the same content signals continue to be transmitted to the renderer 3, and the control signals related to the content signals continue to be transmitted to the CAS client 2 ("YES" in step S22), the decoding operations of the content signals shown in steps S5 to S7 are repeated until the elapsed time reaches an end of the preview time period.

When the same content signal is not transmitted ("NO" in step S22) before the decoding time for the content signals, or the transmission time for the decryption keys (equivalent to the elapsed time measured by the timer 22), reaches an end of the preview time period, the control Unit 21 instructs the decryption key generating unit 23 to stop transmitting the decryption keys (step S23). Furthermore, the control unit 21 stores the elapsed time measured by the timer 22, or the "time period for which the preview time-decryption keys are transmitted to the renderer 3," as the remaining preview time period (transmission time information) (step S24). As the transmission of the decryption keys stops, the decoding process of the content signals also stops.

The preview process is completed when the above steps have ended.

On the other hand, when the content signals allowed to be previewed are being received ("YES" in step S1), the control unit 21 determines whether the content signals have been previewed, or more specifically, whether the remaining preview time period for the content signals is stored (step S21).

In the case where the preview has not been completed ("NO" in step S21), the control unit 21 sets the preview time period in the timer 22 according to the control signals (step S2a) in the same manner as step S2 shown in FIG. 2. On the other hand, if the preview has been completed and the remaining preview time period is stored, the control unit 21 sets the remaining preview time period in the timer 22 (step S2b).

The subsequent steps S3 to S6 have been described above. Based on the remaining preview time period set in step S2b, step S7 determines whether the reading of the timer 22 has reached zero, that is, whether the total time measured reaches the end of the preview time period. As a result, the encoded content signals are decoded during the preview time period once or a plurality of times.

As such, in the second embodiment, the remaining preview time period is stored when the preview is ended during the preview. The content signals can therefore be decoded at a plurality of times within a preview time period, allowing the content to be viewed by the user during the preview time period continuously or with intervals, for convenience sake.

The present embodiment shows an example in which the control unit 21 stores the remaining preview time period, but the timer 22 itself may do the same. In this case, when the remaining preview time period is stored, the timer 22 starts timing accordingly; when the time period is not stored, the timer 22 may start timing based on the preview time period set in the control unit 21. Also, while the present embodiment shows the example of storing the remaining preview time period, the decoding time period already consumed for a preview can be stored instead, and the control unit 21 calculates the remaining preview time period accordingly. Various modifications are also possible.

Third Embodiment

In the first and second embodiments described above, the timer 22 is disposed in the CAS client 2, and the time period during which the CAS client 2, the primary transmitting element, transmits the decryption keys is controlled. On the other hand, in the third embodiment described below, a timer is disposed in the renderer to control the time period for decoding the content signals in the renderer.

Figure 4:
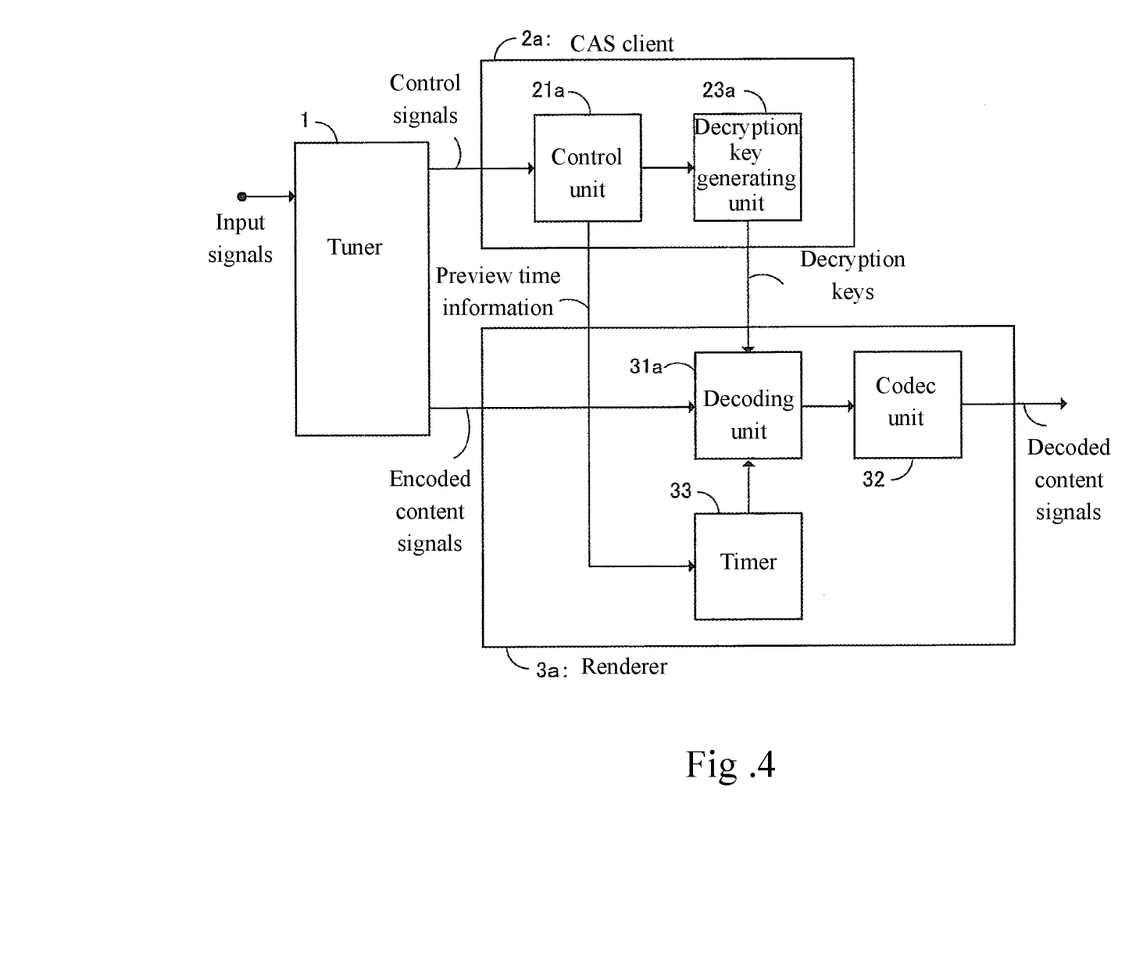
FIG. 4 is a block diagram showing a schematic configuration of an electronic device according to a third embodiment of the present invention.

FIG. 4 is a block diagram showing a schematic configuration of an electronic device according to the third embodiment of the present invention. Elements therein shared by FIG. 1 are denoted by the same reference numerals, while differences will be described below.

The CAS client 2a in the present embodiment includes a control unit 21a and a decryption key generating unit 23a. When the control unit 21a determines that the preview is possible judging from the control signals, it instructs the decryption key generating unit 23a to generate the decryption keys and to transmit the decryption keys as well as the preview time information indicating the preview time period to the renderer 3a. The decryption key generating unit 23a generates the decryption keys according to the instructions from the control unit 21a, and transmits the decryption keys to the renderer 3a. In this manner, the CAS client 2a operates as a decryption key transmitting unit that transmits the decryption keys and the preview time information.

The renderer 3a in the present embodiment includes a timer (timing unit) 33 in addition to the decoding unit 31a and the codec unit 32. Upon receiving the preview time information from the control unit 21a of the CAS client 2a, the timer 33 starts timing, that is to say, the timer 33 counts down using the preview time amount indicated by the preview time information as an initial value. Upon receiving the decryption keys, the decoding unit 31a decodes the encoded content signal on condition that the elapsed time measured by the timer 33 has not reached the preview time period, that is, the reading of the timer 33 has not reached zero. The decoding unit then converts the decoded signals into video and audio signals. In this manner, the renderer 3a operates as a decryption key receiving unit that receives the decryption keys and decodes the encoded content signals during the preview time period using the decryption keys.

Figure 5:
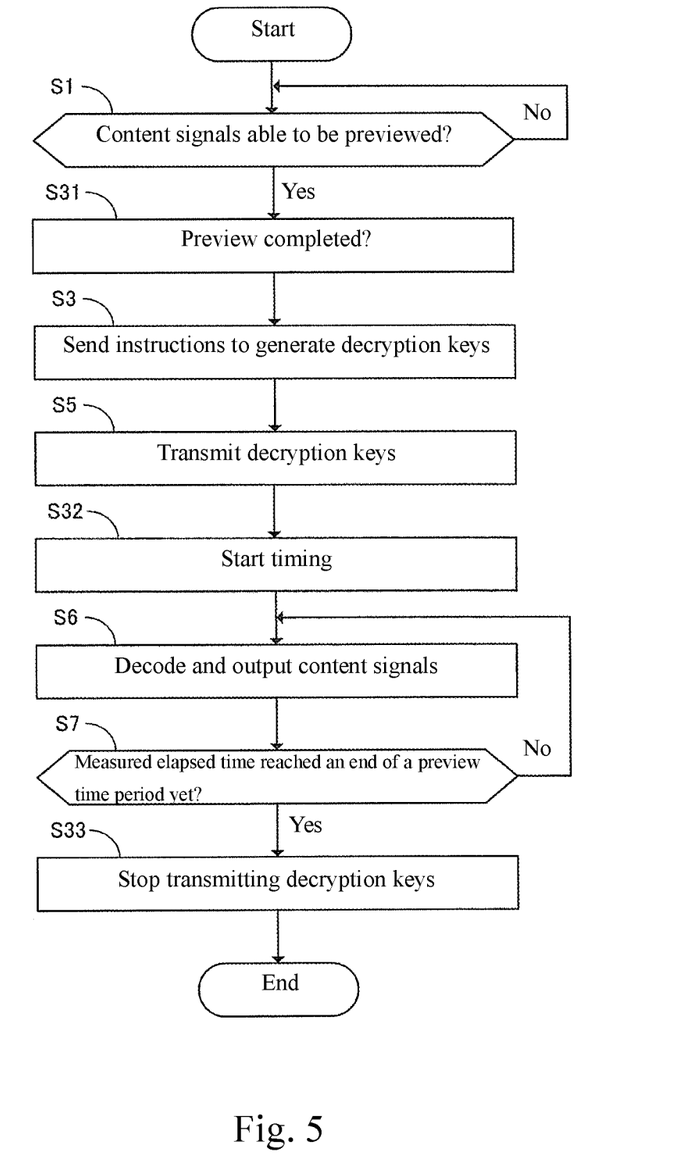
FIG. 5 is a flowchart showing an example of operations for running a preview in the electronic device shown in FIG. 4.

FIG. 5 is a flowchart showing an example of operations for running a preview in the electronic device shown in FIG. 4. Operations therein shared by FIG. 2 are denoted by the same reference numerals, while differences will be described below.

When the content signals able to be previewed are being received ("YES" in step S1), the control unit 21a transmits preview time information indicating the preview time period to the timer 33 of the renderer 3a (step S31) Also, the control unit 21a instructs the decryption key generating unit 23a to generate decryption keys and start transmitting the keys to the renderer 3a (step S3). As a result, the decryption key generating unit 23a starts transmitting the decryption keys to the renderer 3a (step S5). Later, regardless of the elapsed time measured by the timer 33, the decryption key generating unit 23a continues to transmit the keys to the renderer 3a while receiving the same content signals.

On the other hand, the timer 33 of the renderer 3a starts timing upon receiving the preview time information, and counts down using the preview time amount as an initial value (step S32). Upon receiving the decryption keys, the decoding unit 31a decodes the encoded content signals using the decryption keys. Furthermore, the codec unit 32 converts the decoded content signals into video and audio signals (step S6). In this manner, the timer 33 starts timing at the same time when the decryption keys are being received by the decoding unit 31a, or as the decoding process begins.

Also, the decoding unit 31a checks the elapsed time measured by the timer 33 while decoding the content signals (step S7). If the measured time has not reached the end of the preview time period, that is, if the reading has not reached zero ("NO" in step S7), the decoding unit 31a continues to decode the content signals (step S6). On the other hand, when the measured time reaches the end of the preview time period, that is, when the reading reaches zero ("YES" in step S7), the decoding unit 31a continues to receive the decryption keys but stops decoding the content signals (step S33). As such, when the decoding time is deemed to have reached the end of the preview time period based on the elapsed time measured by the timer 33, the decoding process for the content signals is stopped.

In addition, when the timer 33 starts timing at the same time when the decryption keys are being received, step 7 can be carried out by simply stopping the decoding process while the measured time reaches the end of the preview time period. On the other hand, when a time lag occurs between the start of key reception and the start of timing by the timer 33, step S7 can be carried out by simply taking into account the lag and stopping the transmission of the keys as soon as the transmission time for the decryption keys reaches the end of the preview time period.

In such case, in the third embodiment, the timer 33 is disposed in the renderer 3a and the preview time information is transmitted to the renderer 3a. Next, based on the elapsed time measured by the timer 33, the decoding time period is controlled in the renderer 3a. As a result, no feedback from the renderer 3a to the CAS client 2a is required, and the preview can be performed through simple procedures.

Additionally, in the present embodiment, the decoding unit 31a continues to receive the decryption keys even after the preview time has elapsed. Therefore, should the renderer 3a be modified, the content may still be decoded by the decoding unit 31a even after the preview time has elapsed. Therefore, in the present embodiment, it is preferable that the renderer 3a be configured to have a strong structure so as not to be modified.

Furthermore, a variation of the third embodiment can carry out the same operations as in the second embodiment. In other words, when the content signals are decoded during the preview time period, the remaining preview time period, or the result of "the preview time amount minus the time amount required for completion of decoding," is transmitted as decoding time information from the renderer 3a to the CAS client 2a, and stored in advance in the control unit 21a. Later, when the same contents are being received again, preview time information indicating the remaining preview time period may also be transmitted to the renderer 3a so that the content can be previewed during the remaining preview time period. Alternatively, the remaining preview time period may be stored in advance in the renderer 3a.

In addition, each of the embodiments above shows an example in which a tuner, a CAS client, and a renderer are disposed in an electronic device, but a part of these elements may be disposed in a separate device or omitted. For example, a CAS client may be disposed in the first electronic device and a renderer in the second electronic device.

At least a part of each part of the electronic device described in the above embodiments may be hardware or software-configured. In the case of software configuration, a program for performing at least a part of the functions of each part of the electronic device may be stored in a recording medium, such as a floppy disk or a CD, and read by a computer for execution. The recording medium is not limited to removable types such as floppy disks or CDs, and may be fixed types such as a hard disk drive or memories.

Also, a program performing at least a part of the functions of each part of the electronic device may be distributed via a communication channel (including wireless communication) such as the Internet. Furthermore, when encoded, modulated, or compressed, the program may be distributed via a wired channel such as the Internet or a wireless channel, or stored in a recording medium for distribution.

Based on the above description, one skilled in the art may conceive additional effects and variations of the present invention, but aspects of the present invention are not limited to each embodiment described above. Various additions, modifications and partial deletions are possible without departing from the scope of concepts and ideas of the present invention that are derived from the content defined in the claims and their equivalents.

What is claimed is:

1. An electronic device, which decodes encoded content signals using decryption keys, comprising: a hardware processor executing a decoding program so as to perform the functions of a decryption key transmitting unit and a decryption key receiving unit, wherein the decryption key transmitting unit, transmits the decryption keys and displays time information indicating a preset time period for the content signals, and the decryption key receiving unit, receives the encoded content signals, the decryption keys and the time information, and decodes the content signals using the decryption keys, wherein the decryption key receiving unit starts timing simultaneously at a time when reception of the decryption keys starts, and decoding of the content signals is stopped when measured elapsed time reaches an end of the preset time period; wherein when the decoding of the content signals is stopped before the measured elapsed time reaches the end of the preset time period, time information indicating a completion of decoding the content signals is, based on the measured elapsed time, stored in advance; and wherein when the content signals are being received again, the content signals continue to be decoded, based on the time information indicating the completion of decoding which has been stored, before a total amount of time for decoding the content signals reaches the end of the preset time period, and the decoding of the content signals is stopped when the total amount of time for decoding the content signals reaches the end of the preset time period, wherein the electronic device further comprising a tuner, wherein the encoded content signals are extracted from input signals and sent to the decryption key receiving unit, and wherein control information displaying the preset time period is extracted from the input signals and sent to the decryption key transmitting unit.

2. The electronic device of claim 1, wherein the decryption key receiving unit comprises:
   a timing unit, which starts timing at the same time when the reception of the decryption keys starts; and
   a decoding unit, which decodes the content signals using the decryption keys, wherein the decoding of the content signals is stopped when elapsed time measured by the timing unit reaches the end of the preset time period.

3. An electronic device, comprising a hardware processor executing a decoding program so as to perform the functions of a decryption key receiving unit, which receives encoded content signals as well as decryption keys for decoding the encoded content signals, displays time information indicating a preset time period for the content signals, and decodes the content signals using the decryption keys, wherein the decryption key receiving unit starts timing simultaneously at a time when reception of the decryption keys starts, and decoding of the content signals is stopped when measured elapsed time reaches an end of the preset time period; wherein when the decoding of the content signals is stopped before the measured elapsed time reaches the end of the preset time period, time information indicating a completion of decoding the content signals is, based on the measured elapsed time, stored in advance; and
   wherein when the content signals are being received again, the content signals continue to be decoded, based on the time information indicating the completion of decoding which has been stored, before a total amount of time for decoding the content signals reaches the end of the preset time period, and the decoding of the content signals is stopped when the total amount of time for decoding the content signals reaches the end of the preset time period;
   wherein the electronic device further comprising a tuner, wherein the encoded content signals are extracted from input signals and sent to the decryption key receiving unit, and wherein control information displaying the preset time period is extracted from the input signals.

4. A computer for executing a decoding program for enabling the computer to operate as an electronic device recited in claim 1 so as to perform corresponding functions of each unit included in the electronic device.

5. A computer for executing a decoding program for enabling the computer to operate as an electronic device recited in claim 2 so as to perform corresponding functions of each unit included in the electronic device.

* * * * *